United States Patent
Chintala

(12) 
(10) Patent No.: US 7,077,692 B2
(45) Date of Patent: Jul. 18, 2006

(54) DEVICES AND METHODS FOR MOUNTING CIRCUIT ELEMENTS

(75) Inventor: Thomas J. Chintala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/964,105

(22) Filed: Oct. 12, 2004

(65) Prior Publication Data

US 2006/0079105 A1 Apr. 13, 2006

(51) Int. Cl.
*H01R 13/40* (2006.01)

(52) U.S. Cl. .................. 439/500; 429/96; 439/680; 439/948; 439/76.1

(58) Field of Classification Search ............... 439/620, 439/500; 361/742, 752, 758, 804; 429/96, 429/98, 680, 948
See application file for complete search history.

(56) References Cited

U.S. PATENT DOCUMENTS

| 4,420,706 | A | * | 12/1983 | Siebold et al. ............... 310/324 |
| 5,213,513 | A | * | 5/1993 | Brown et al. .................. 439/68 |
| 5,658,165 | A | * | 8/1997 | Yokota ........................ 439/495 |
| 5,721,452 | A | * | 2/1998 | Fogal et al. ................. 257/685 |
| 5,830,007 | A | * | 11/1998 | Fry et al. ..................... 439/500 |
| 5,943,214 | A | * | 8/1999 | Sato et al. ................... 361/752 |
| 5,959,845 | A | * | 9/1999 | Faucher ....................... 361/777 |
| 5,984,697 | A | * | 11/1999 | Moran et al. ................. 439/92 |
| 6,017,225 | A | * | 1/2000 | Michiya et al. ............... 439/91 |
| 6,356,448 | B1 | * | 3/2002 | DiBene et al. .............. 361/721 |
| 6,587,351 | B1 | * | 7/2003 | Hollinsworth et al. ...... 361/758 |

* cited by examiner

*Primary Examiner*—Neil Abrams
(74) *Attorney, Agent, or Firm*—Philip R. Wadsworth; Sandip S. Minhas; Abdollah Katbab

(57) ABSTRACT

The described embodiments provide devices and methods for creating an electrical connection in an electronic system. The devices and methods include a standoff that connects a circuit element with a circuit board and supports the circuit element at a sufficient height above the circuit board to create an additional layout area. The additional layout area may be utilized to mount additional circuit elements to the circuit board.

32 Claims, 4 Drawing Sheets

DEVICES AND METHODS FOR MOUNTING CIRCUIT ELEMENTS

STATEMENT REGARDING FEDERALLY SPONSORED RESEARCH OR DEVELOPMENT

This invention was made with government support under United States government contract MDA904-01-G-0620 awarded by the National Security Agency. The government may have certain rights in this invention.

CROSS-REFERENCE TO RELATED APPLICATIONS

This invention is related to applicants' following U.S. patent applications, each hereby incorporated by reference: application Ser. No. 10/964,403, entitled "Devices And Methods For Retaining An Antenna," filed concurrently herewith; application Ser. No. 10/963,962, entitled "Devices And Methods For Retaining A Lens In A Mobile Electronic Device," filed concurrently herewith; and application Ser. No. 10/964,405, entitled "Devices And Methods For Connecting Housings," filed concurrently herewith.

BACKGROUND

The described embodiments relate to electronic systems, and more particularly, to devices and methods for connecting electrical components within electronic systems.

In electronic devices that utilize a circuit board, there are a number of different mechanisms for linking two electrical components, such as the circuit board and a circuit element such as a resistor, capacitor, etc. For example, such circuit elements may have leads that are mounted in plated through holes in the circuit board, known as "through hole" technology, or on contact pads on the surface of the circuit board, known as "surface mount" technology. The plated through holes and the contact pads are electrically connected to a conductive pattern of traces on the surface and/or in various layers of the circuit board. The circuit elements may then be soldered to the circuit board to complete a circuit and form a working electronic device.

One drawback of "through hole" and "surface mount" technology, however, is that each circuit element takes up space on the surface of the circuit board. With an increasing demand for more complex electronic devices, an increasing number of circuit elements are required, which thereby requires an increased amount of circuit board surface area for mounting the circuit elements. Additionally, there is an increasing demand for mobile electronic devices, with an emphasis on compact design. Thus, there is a demand for mounting an increasing number of circuit elements onto a circuit board having the smallest possible area.

To address this need, some components are electrically linked through pin and socket type connectors. Pin and socket connectors may directly mate adjacent components, or the components may be positioned at any convenient location with the pin and socket connectors linked together by flexible cables. These types of connectors include ribbon cable connectors and pig tail connectors. These pin and socket type connectors have a number of drawbacks, however, such as a relatively high cost due to the number and complexity of the parts of the connector. Additionally, pin and socket type connectors require relatively high tolerances between the mating pins and sockets. Further, the ribbon cable and pig tail type flexible connectors may be inadvertently left in the unconnected state during assembly or rework, leading to additional costs associated with discovering and correcting this error.

Other types of connectors include compression connectors, which consist of a plastic body that houses spring-like leads extending out of the top of the body that resiliently compress when contacted with a mating component. A drawback is that these types of connectors take up a substantial amount of circuit board space as they are sized to accommodate various bends in the metal leads to achieve the spring-like characteristic. Further, these types of connectors typically include gull-wing leads, extending from a bottom portion of the body, that are soldered to the circuit board. These projecting gull-wing leads further reduce the available space for mounting or connecting additional circuit elements to the circuit board. Additionally, gull-wing solder joints are known to fail when subjected to static compressive loads and cyclic compressive loads. Many electronic devices, such as any device having a phone keypad, a QWERTY keyboard, and navigation or gaming keys, are typically subjected to both static and cyclic compressive loads due to the many key presses over time. Such compressive loads have been known to cause failures due to broken gull-wing solder joints between a circuit board and a component, or in board-to-board connections.

Thus, devices and methods for connecting electrical components are desired which increase the number of circuit elements that can be connected in a given limited area of a circuit board space, and that can better withstand static and cyclic compressive loading.

BRIEF SUMMARY

In accordance with one aspect, the described embodiments provide a device and method for securely connecting circuit elements to a circuit board in a manner that increases the density of circuit elements mounted directly to the surface of the circuit board.

In one embodiment, an electronic system comprises at least one standoff having a contact pad substantially lying in a first plane and an electrical conductor extending from the contact pad. The system further includes at least one circuit element having a body and at least one compression lead connectable between the body and the contact pad. The body having a footprint corresponding to a two-dimensional area associated with a portion of the body. And, the system including a circuit board having a surface with an available layout area corresponding to a predetermined area on the surface usable for mounting circuit elements, wherein at least one standoff is connectable to the circuit board. Further, the surface substantially lies in a second plane spaced apart from and overlying the first plane, and the available layout area includes at least a portion of a projected area of the footprint.

In another embodiment, an electronic system comprises a circuit board having a surface including a pattern of electrically-conductive traces and at least one standoff having an electrically-conductive contact plate and at least one electrically-conductive standoff lead. The standoff lead extends from the contact plate and is connectable with a portion of the pattern of electrically-conductive traces. And, the contact plate is positioned at a predetermined height above the surface and provides a mechanical support for at least one circuit element to be positioned at a sufficient height above the surface to allow additional circuit elements to be mounted to the surface below the at least one circuit element.

In yet another embodiment, an electronic system comprises a circuit board having a surface with an available layout area corresponding to a predetermined area usable for mounting circuit elements, where the available layout area including a pattern of electrically-conductive traces. The system includes at least one standoff having an electrically-conductive contact plate in electrical communication with at least one electrically-conductive standoff lead, wherein at least one standoff lead extends from the contact plate and is connectable with a portion of the pattern of electrically-conductive traces. The contact plate comprises a flat area at a sufficient height to support at least one connectable circuit element away from the surface such that the available layout area includes at least a portion of an area on the surface under the circuit element.

In a further embodiment, an electronic system comprises a circuit board having a surface including a pattern of electrically-conductive traces and an available layout area corresponding to a predetermined area usable for mounting circuit elements. The system includes a plurality of standoffs each having an electrically-conductive contact plate in electrical communication with at least one electrically-conductive standoff lead. Each standoff lead extends from the contact plate and is connectable with a portion of the pattern of electrically-conductive traces. Further, each standoff lead supports a respective contact plate at a predetermined height relative to the surface, wherein each contact plate comprises a flat area. Additionally, the system includes at least one circuit element having a body and a pair a compression leads. The pair of compression leads are contactable with the corresponding contact plates of the plurality of standoffs. And, the body is supportable by at least one of the plurality of standoffs at a sufficient height from the surface such that the available layout area includes at least a portion of an area of the surface facing the body.

In still another embodiment, a mobile communications device comprises a circuit board having a surface that includes a pattern of electrically-conductive traces and a plurality of standoffs each having a contact pad electrically connected to the pattern of electrically-conductive traces. Each contact pad is positioned at a constant predetermined height above the surface of the circuit board. The device further includes a first housing having an internal surface that includes a circuit element housing with a first alignment feature and an audio speaker having at least one lead and a body with a second alignment feature. The audio speaker is at least partially positionable within the circuit element housing such that the second alignment feature mates with the first alignment feature to orient at least one lead with a corresponding one of the plurality of standoffs. Each lead being connectable with the corresponding standoff and the audio speaker such that the audio speaker is supportable by the standoffs at a sufficient height above the circuit board surface to create an additional layout area between the surface and the body.

Further, another embodiment discloses a method of mounting circuit elements on a circuit board. The method comprises connecting a first lead from a first standoff to a pattern of electrically-conductive traces on a surface of the circuit board, where the first standoff includes a first contact plate spaced a first predetermined constant distance above the surface. Further, the method includes connecting a second lead from a second standoff to the pattern of electrically-conductive traces on the surface of the circuit board, where the second standoff includes a second contact plate spaced a second predetermined constant distance above the surface. And, the method includes connecting at least one circuit element in at least a portion of an area on the surface adjacent to the first standoff and the second standoff that corresponds to a projected area on the surface of a body of an elevated circuit element contactable with and supportable by the first standoff and the second standoff.

Additional aspects and advantages of the described embodiments are set forth in part in the description which follows, and in part are obvious from the description, or may be learned by practice of the described embodiments. The aspects and advantages of the described embodiments may also be realized and attained by the means of the instrumentalities and combinations particularly pointed out in the appended claims.

BRIEF DESCRIPTION OF THE DRAWINGS

The various embodiments of the present invention will hereinafter be described in conjunction with the appended drawings provided to illustrate and not to limit the present invention, wherein like designations denote like elements, and in which.

DETAILED DESCRIPTION

Figure 1:
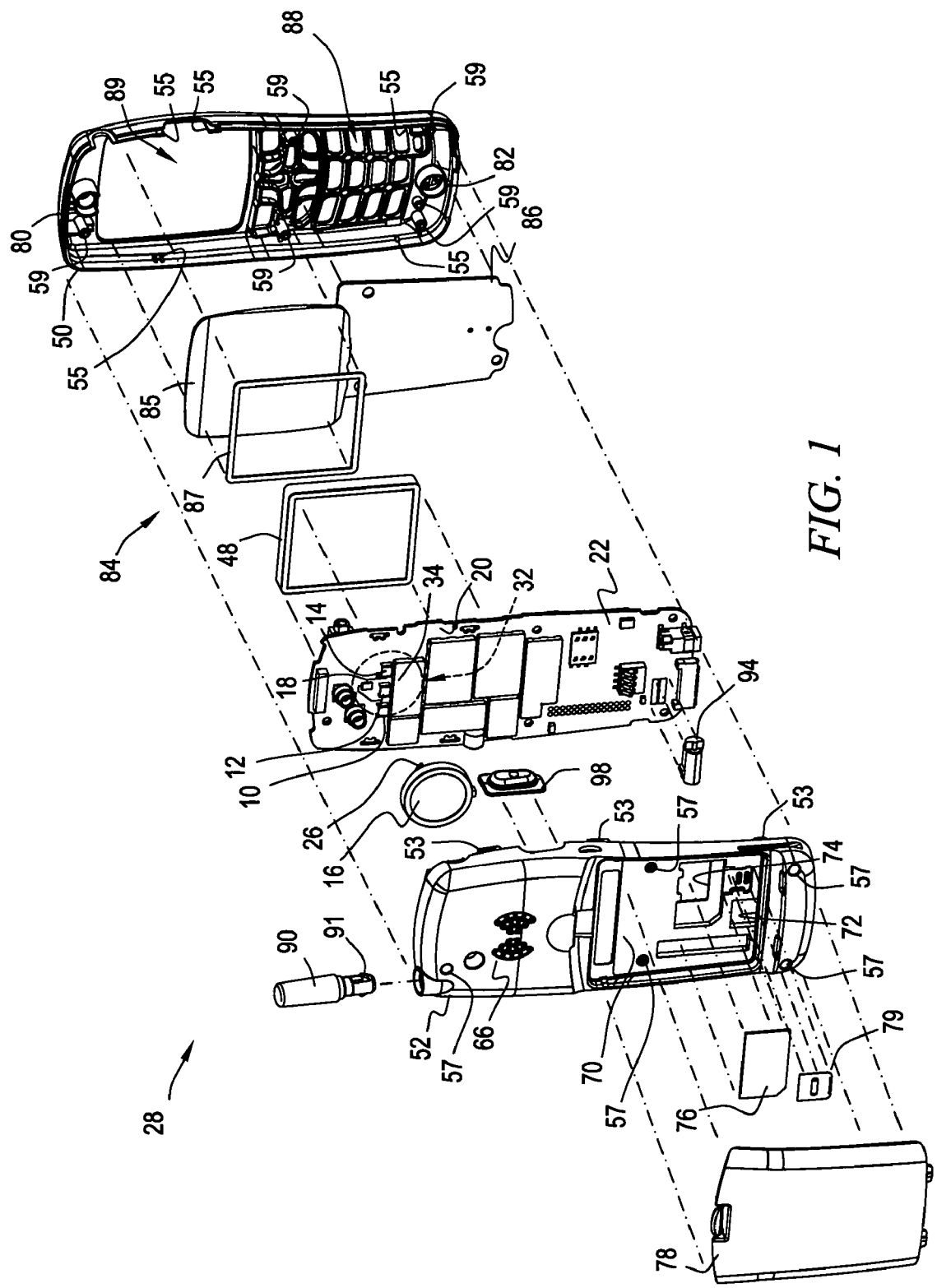
FIG. 1 is an exploded perspective view of one embodiment of an electronic system, such as a mobile phone, including a pair of standoffs that connect a circuit element to a circuit board at a sufficient height above the circuit board to create an additional layout area for mounting additional circuit elements.

Before select embodiments are explained in detail, it is to be understood that these embodiments are not limited in application to the details of the construction and the arrangement of the components set forth in the following description or illustrated in the drawings. The disclosed embodiments are capable of other forms and may be carried out in various ways. Also, it is understood that the phraseology and terminology used herein is for purpose of description and should not be regarded as limiting.

Referring to FIGS. 1–4, one embodiment of a system and method for creating an electrical connection to an electronic device includes one or more standoffs 10, 12, 14 that form an electrical connection between circuit element 16, such as a speaker, and a pattern of electrically-conductive traces 18 on surface 20 of circuit board 22. In this embodiment, standoffs 10 and 14 contact opposing leads 24, 26 (FIG. 3) that extend from circuit element 16 to transmit electrical signals that control the interaction between the circuit element and the electronic system 28, and in particular circuit board 22. Additionally, standoffs 10 and 14 are structural components that support circuit element 16 a sufficient height 30 (FIG. 3) above surface 20 to create an additional layout area 32 (FIGS. 1 and 4) where additional circuit elements 34 (FIGS. 1 and 4) may be placed on surface 20.

By allowing placement of additional circuit elements 34 on surface 20, standoffs 10 and 14 enhance the functionality and provide for a more compact design of electronic system 28. Standoff 12, which is an optional component, may also be utilized to provide additional structural support to maintain circuit element 16 in a position off of surface 20. Thus, standoffs 10, 12, 14 provide an electrical connection and structural support to elevate circuit element 16 off of circuit board 22, thereby providing an additional layout area 32 in which additional circuit elements 34 may be connected to circuit board 22.

Standoffs 10, 12, 14 each include a contact pad or plate 36 for connecting with circuit elements and electrical conductors or leads 38, 40 extending from the contact pad 36 to connect with the pattern of conductive traces 18 on circuit board 22. Contact pad or plate 36 may include a flat, planar surface or a curvilinear surface having a sufficient area in which to make electrical contact with corresponding leads of a circuit element. Leads 38, 40 have a predetermined length, which may be a constant length, and may be substantially rigid or non-compressive such that they support contact pad or plate 36 at a predetermined height 42 (FIG. 3) above surface 20. For instance, surface 20 may lie substantially in a first plane and contact pad or plate 36 may lie substantially in a second plane at predetermined height 42. It should be noted that predetermined height 42 of the contact pads or plates 36 may be the same height as sufficient height 30 of circuit element 16, or these two height may differ. For example, if the contact pads or plates 36 connect directly to the body of circuit element 16, then both heights 30, 42 may be the same. In another example, circuit element 16 may include leads 24, 26 extending from its body, or may include an additional support mechanism 43 (FIGS. 3 and 6), such as a elastic body, felt, or non-electrically-conductive material, that further aid in supporting circuit element 16 such that height 42 may be less than height 30. Additionally, it may be desired to support circuit element 16 at some angle relative to surface, thereby causing heights 30, 42 to be different. Further, circuit element 16 may have a body with an uneven shape that may cause the height 42 of each contact pad or plate 36 to be different. Leads 38, 40 may have the same width as contact pad or plate 36, as detailed below, or they may have a different width. Further, leads 38, 40 may include one or more legs or extensions that function to connect contact pad or plate 36 with circuit board 22. Additionally, leads 38, 40 may have any one of a variety of shapes, such as a straight leg or extension, a J-shaped extension, an L-shaped extension or a gull-wing type of extension. Moreover, leads 38, 40 may be formed integrally with contact pad or plate 36, or they may be independently formed and attached. All or portions of contact pad or plate 36 and leads 38, 40 may be formed from an electrically-conductive material. Suitable examples of electrically-conductive materials include, but are not limited to, silver, copper, gold, aluminum and super-conducting ceramics. In one embodiment, for example, standoffs 10, 12, 14 may be fashioned from a strip of copper material, where a predetermined length of material is cut from the strip, and then the predetermined length of material is bent twice to form leads 38, 40 and contact pad or plate 36. In alternate embodiments, for example, the contact pad or plate and the leads may be formed as electrically-conductive deposits or inserts on a non-electrically-conductive body or block of material. Thus, standoffs 10, 12, 14 include any connector having a contact pad or plate supported at a predetermined height above and electrically connected to a circuit board.

Circuit element 16 includes any electrical component capable of being mounted to circuit board 22 and/or connected to the pattern of conductive traces 18 that, along with additional circuit elements 34, form a circuit that performs an electrical function. Suitable examples of circuit element 16 include, but are not limited to: an audio speaker; a resistor; a capacitor; an inductor; a switch; an electrical frequency filter; an electrical connector; a circuit board; a chip; an electrical or radio signal shield; a visual display unit; a keyboard unit; a battery unit; a memory device; a processor; an integrated circuit or chip or set of microminiaturized, electronic circuits; a transistor; a motor; a rotating unbalanced mechanism; an antenna mechanism; a microphone; a buzzer; and an acoustical device. Circuit element 16 generally includes a body or package 44 that contains the functional components and leads 24, 26 that electrically connect the circuit element to the circuit. Body or package 44 may be of any shape or size, and has a footprint that corresponds to additional layout area 32 created by circuit element 16 being positioned above surface 20 of circuit board 22. The term "footprint" therefore refers to an area on surface 20 that would be covered by body or package 44 if circuit element 16 were mounted on surface 20. Leads 24, 26 may be of any shape or design suitable for connecting circuit element 16 to contact pad or plate 36. Suitable examples of types of leads 24, 26 include but are not limited to compression leads, gull-wing leads, J-leads, contact pads or plates, lands and standoffs. All or portions of leads 24, 26 may be formed from an electrically-conductive material. Suitable examples of electrically-conductive materials include, but are not limited to, silver, copper, gold, aluminum and super-conducting ceramics.

Circuit element 16 is supported by standoffs 10, 12, 14 at height 30 (FIG. 3), which is a suitable height for allowing additional circuit elements 34 to be mounted in the area 32 (FIG. 4) of the footprint of circuit element 16. Additional circuit elements 34 may include any of the circuit elements described above that are capable of being mounted on surface 20 of circuit board 22 in the additional layout area 32 created by standoffs 10, 12, 14 raising circuit element 16 off of surface 20.

Circuit board 22 includes any substrate having integral electrically-conductive elements, including active and/or passive circuitry. For example, circuit board 22 may include rigid or flexible, single, double or multilayered boards that are processed to contain circuit configurations. In particular, circuit board 22 may include a substrate of a glass fabric impregnated with a resin, such as epoxy, that is cured and clad with a metal, such as copper, upon which the pattern of conductive traces 18 are fabricated to create circuitry and/or interconnect circuit elements. The area on surface 20 suitable for mounting and/or connecting circuit elements is known as the "available layout area." In general, the entire area of surface 20 may be utilized for mounting and/or connecting circuit elements. In practice, however, the available layout area is less than the entire surface area of circuit board 22 in order to create clearance between circuit elements or adjacent components, such as to reduce electrical or magnetic interference or to create attachment areas, and because many circuit elements have a footprint on the surface that is substantially larger than the area needed to connect that circuit element to the circuit board 22. Circuit board 22 and the various circuit elements mounted thereon generally define an electronics module 46 (FIG. 3) that provides the electrical functionality to electronic system 28.

Figure 2:
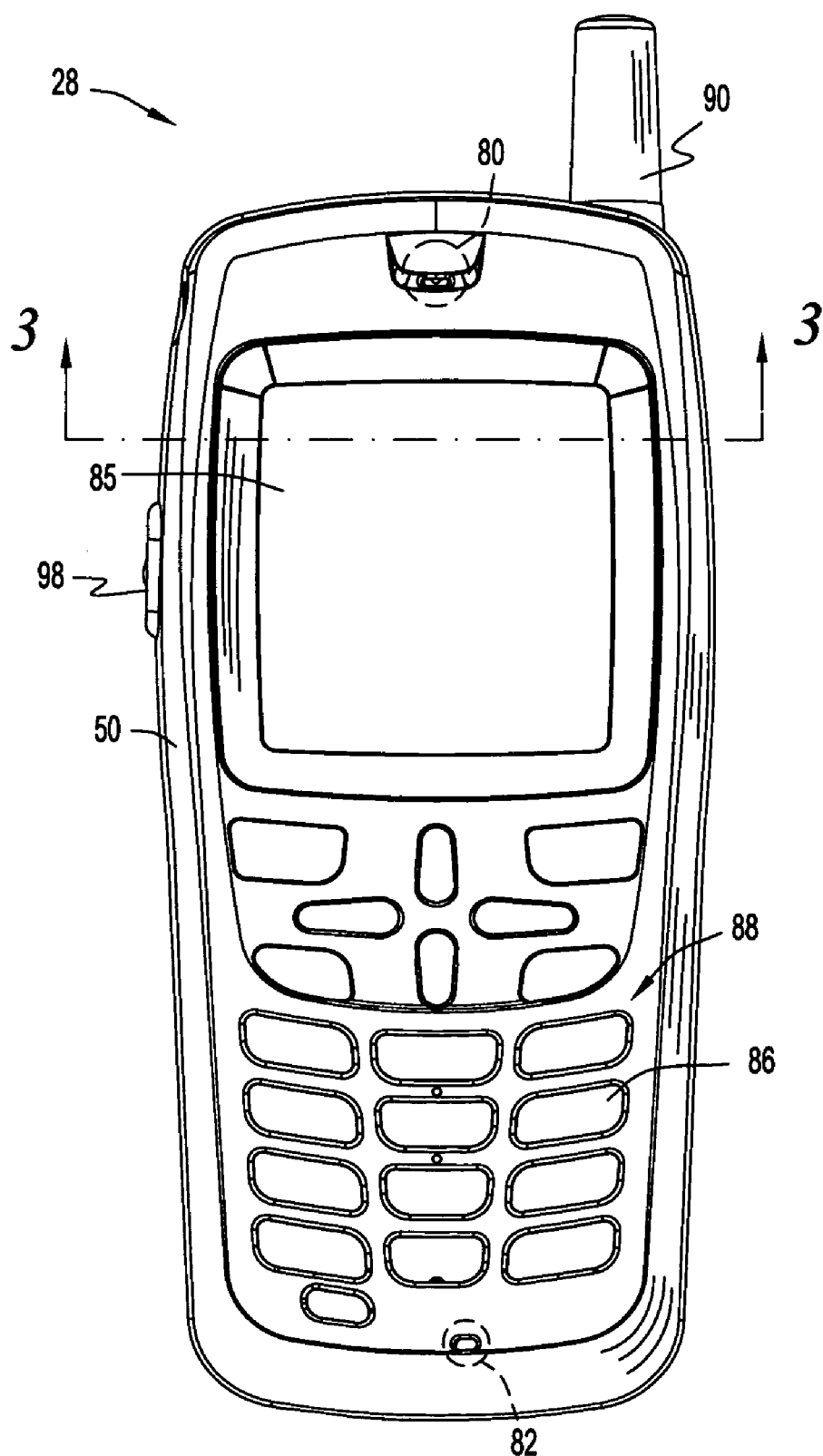
FIG. 2 is a front view of the electronic system of FIG. 1.

Electronic system 28 may include any type of device designed to perform an electrical function. Referring to FIGS. 1 and 2, in one embodiment, electronic system 28 may be a mobile electronic device such as a portable device having electronics module 46 (FIG. 3) for sending output signals to a visual display unit 48 which creates a textual or graphical image viewable by a user. Suitable examples of a mobile electronic device include a communications device, a gaming device, a remote control device, a personal computer-type device, a global positioning system ("GPS") receiver or controller, etc. Suitable examples of a communications device for sending and/or receiving communications-related signals include a mobile phone such as a code division multiple access ("CDMA")-based system, a wideband code division multiple access ("WCDMA")-based system, a global system for mobile communications ("GSM")-based system, an advance mobile phone service ("AMPS")-based system and a time division multiple access ("TDMA")-based system, a satellite phone, a portable phone, a pager, a wireless two way communications device, a personal digital assistant, a personal computer, devices communicating via Bluetooth technology, and other similar types of communications systems involving the receipt and/or transmission of short- or long-range communications signals. For example, one embodiment of a mobile electronic device includes the Qualcomm QSec 2700 mobile phone.

Electronic system 28, such as the mobile device of FIGS. 1 and 2, may further include a front housing 50 that mates with rear housing 52 for encasing and protecting the components of electronic system 28. In particular, securing mechanisms 53, 55, such as internal snaps or detents, may be aligned to fix together housings 50, 52, and may a lso help to bias internal mounting surfaces and/or internal components against lens assembly 84. Further, additional securing mechanisms 57, 59, such as nails or screws and associated receiving bosses, may be installed in both housings 50, 52 after they are placed together. The securing mechanisms 53, 55 and 57, 59 fix the housings together in a substantially irreversible manner such that any subsequent attempt to separate the housings results in noticeable damage to the housings. Front and rear housings 50, 52 may be formed from metals, plastics, composites and other similar materials. Either front or rear housing 50, 52 may provide one or more mounting surfaces for some of the components of electronic system 28.

Figure 3:
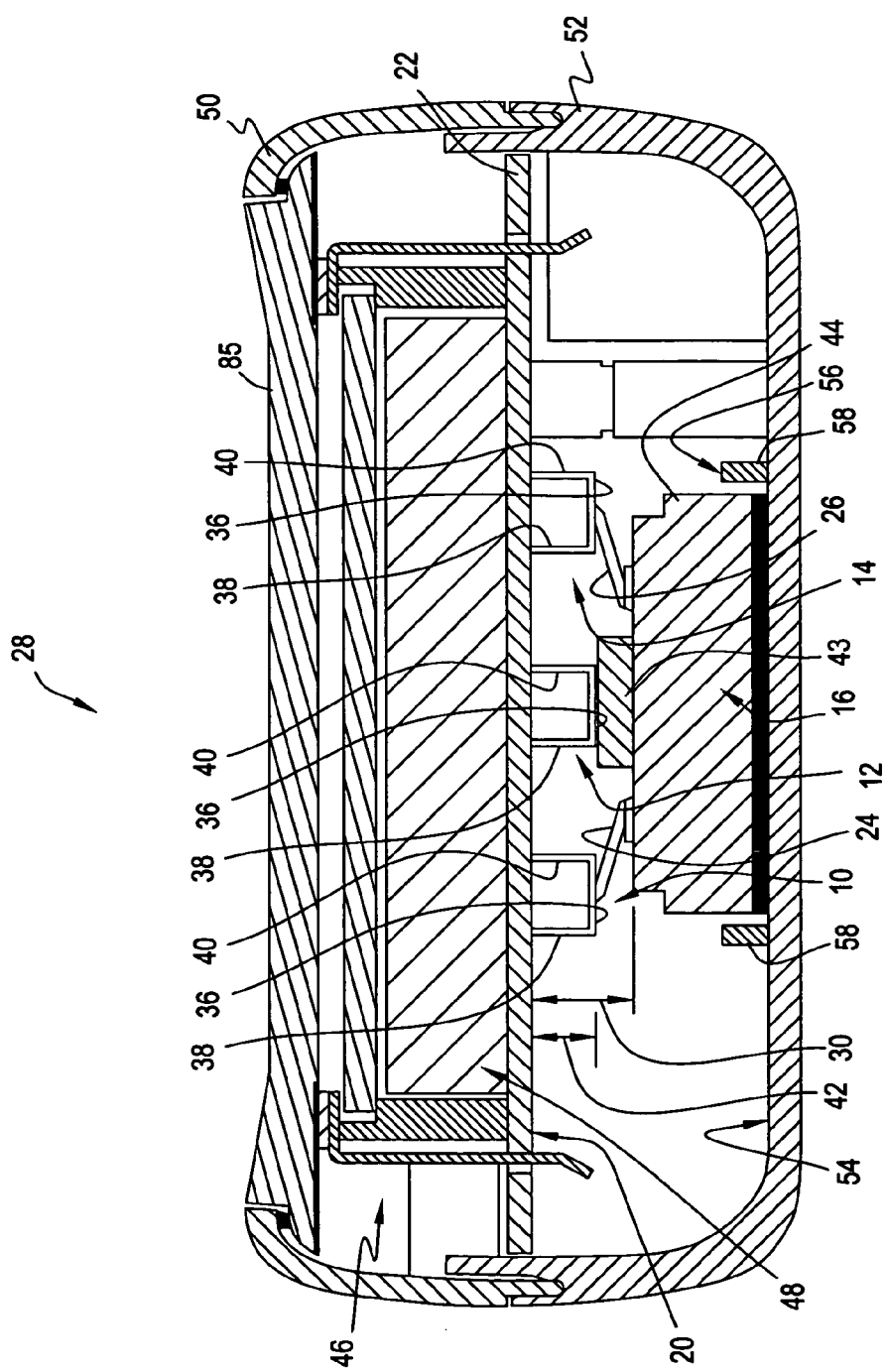
FIG. 3 is a cross-section view along line 3—3 of FIG. 2.
Figure 5:
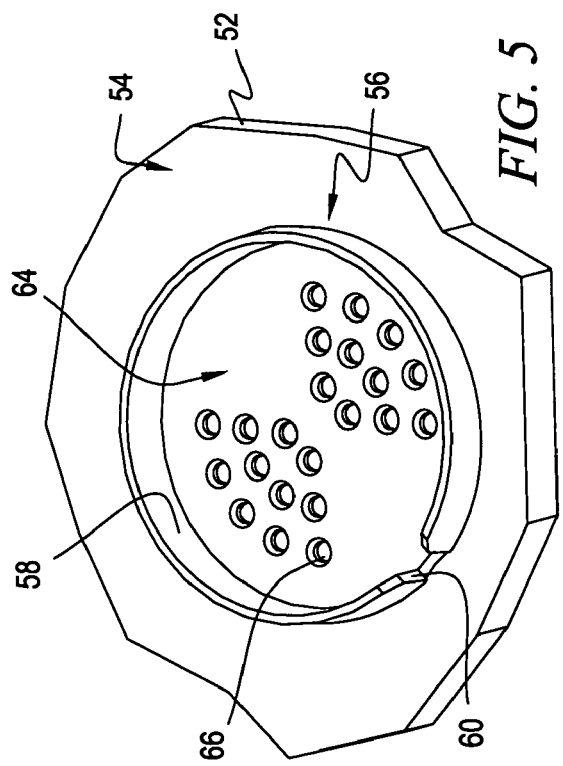
FIG. 5 is a partial perspective view of one embodiment of a circuit element housing and recess formed on an internal surface of the rear housing of FIG. 1.
Figure 6:
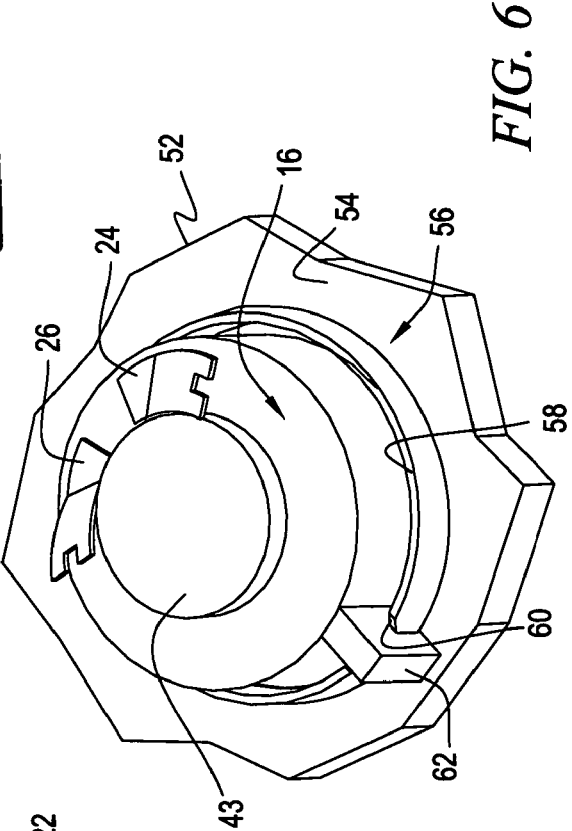
FIG. 6 is a partial perspective view of a circuit element, a far-field speaker in this case, positioned within the recess of the circuit element housing of FIG. 5 such that an alignment projection on the circuit element mates with an alignment notch in the circuit element housing to orient the circuit element leads relative to the standoffs.
Figure 4:
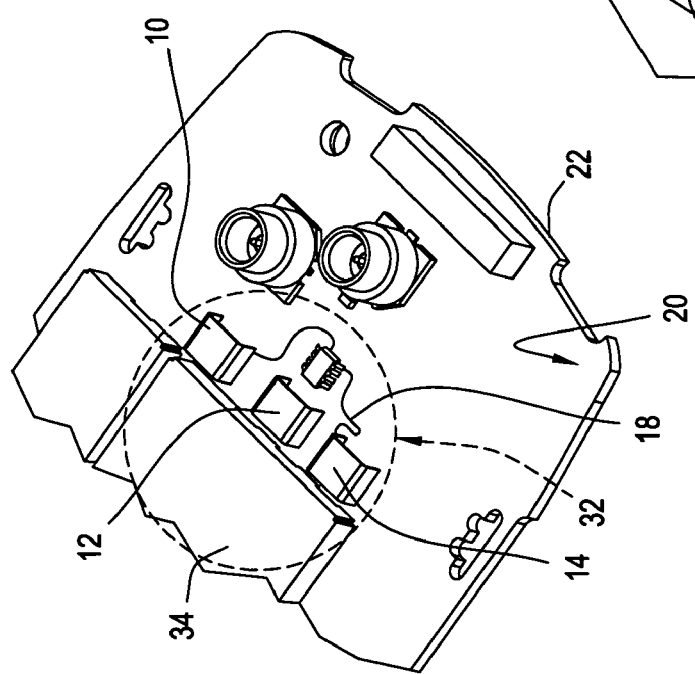
FIG. 4 is a partial perspective view of the circuit board and standoffs of FIG. 1.

In one embodiment, for example referring to FIGS. 3, 5 and 6, rear housing 52 includes an internal surface 54 that supports electronics module 46 (FIG. 3) and circuit board 22 (FIG. 3). Additionally, internal surface 54 of rear housing 52 may include a circuit element housing 56 to aid in holding and positioning circuit element 16 relative to standoffs 10, 12, 14. In this embodiment, circuit element housing 56 includes a wall 58 that projects from internal surface 54 and that further defines an alignment notch 60 (FIGS. 5 and 6) into which mates a corresponding alignment projection 62 extending from body 44 of circuit element 16. Alignment notch 60 and alignment projection 62 thereby form interactive portions of an alignment structure that insures that leads 24, 26 line up with contact pads or plates 36 when housings 50, 52 of electronic system 28 are connected together. Additionally, wall 58 of circuit element housing 56 may define a recess 64 into which at least a portion of circuit element 16 is positioned. For instance, circuit element 16 may be contained within recess 64 during the assembly process. In the embodiment where circuit element 16 is a speaker, internal surface 54 of rear housing 52 may further include holes 66 to allow sound waves to enter and/or exit rear housing 52.

Referring back to FIG. 1, in the embodiment where electronic system 28 includes a mobile device, rear housing 52 may include a recessed portion 70 having one or more openings 72, 74. For instance, a power portion 78, such as a battery pack, may be removably positioned in recessed portion 70 such that its electrical connectors mate through opening 72 with corresponding electrical connector on circuit board 22. Further, a communications card 76, such as a removable user identity module ("RUIM"), may be removably positioned within recessed portion 70, such as with a retaining clip 79, such that its electrical connectors mate through opening 74 with a corresponding electrical connector on circuit board 22. Additionally, electronic device 28 may include input and/or output devices 80 and 82, such as a near field speaker and a microphone, respectively, connected to circuit board 22 and positioned on front housing 50. A lens assembly 84, such as a lens member 85 and a gasket member 87, may be mounted adjacent to opening 89 in front housing 50 and over visual display unit 48 to provide a protective, see-through covering. Further, lens assembly 84 may be fixed between housings 50, 52 in a substantially immovable manner so that any attempt to separate the lens from the front housing results in damage to the front housing and/or the lens, and thus provides evidence of tampering. Further, an input mechanism 86, such as a keypad and navigation mechanism and corresponding keys, may be located within housings 50, 52 and extend through predetermined openings 88 in front housing 50. An antenna mechanism 90 for transmitting and receiving electronic signals, such as communications signals, may be mounted to one of housings 50, 52 and connected to circuit board 22. For instance, in one embodiment, antenna mechanism 90 may include an engagement mechanism 91, such as detents, that fix antenna mechanism 90 to one of housings 50, 52 in a substantially irreversible manner such that attempted removal of antenna mechanism 90 results in damage to at least one of the antenna mechanism and the housings to provide evidence of tampering. Further, in the embodiment of a phone, a push-to-talk button 98 may extend from housings 50, 52 and connect to corresponding switches on circuit board 22. Similarly, a vibrator motor 94 for silently signaling a user may be positioned within one of housings 50, 52 and connected to circuit board 22.

In operation, the use of standoffs 10, 12, 14 allow additional circuit elements 34 to be mounted to circuit board 22 in the footprint of circuit element 16. By raising circuit element 16 a sufficient height 42 above surface 20, standoffs 10, 12 14 allow the footprint of circuit element 16 on surface 20 to be utilized as additional layout area 32. For instance, in one embodiment, a method for mounting circuit elements on circuit board and assembling an electronic system includes connecting the respective leads from a first and a second standoff to a pattern of electrically-conductive traces that form part of a circuit on a circuit board. The connection method may include any manner of establishing electrical continuity between the standoffs and the pattern of traces, such as via removable contact or fixed contact such as via hand soldering, wave soldering, welding, sonic welding, etc. Further, the standoffs may be formed as surface mount or through hole components. Additionally, the standoffs are connected such that at least a portion of their respective contact pads or plates lie a predetermined constant distance above the surface of the circuit board. The predetermined constant distant may vary depending on the size and configuration of the circuit element to be connected with the standoffs, as well as depending on the size and configuration of the additional circuit elements to be mounted on the circuit board between the circuit board surface and the circuit element suspended by the standoffs. Then, the method further includes connecting a circuit element to one or more standoffs such that the standoffs electrically connect the circuit element to the pattern of electrically-conductive traces. This method of connection may include removable contact or fixed contact, as noted above. Additionally, this connection results in the standoffs supporting the circuit element at a sufficient height above the circuit board surface. The sufficient height varies depending on the configuration of the circuit element leads, the size and configuration of the circuit element body, and the size and configuration of the additional circuit elements to be mounted below the suspended circuit element. In one embodiment, the step of connecting the circuit element and the standoffs further includes positioning the circuit element within a circuit element housing formed on the internal surface of a front or rear housing of the electronic system. The circuit element housing supports the circuit element, and may further include an alignment feature such as a notch that interacts with a corresponding feature of the circuit element, such as a projection. The alignment feature of the circuit element housing orients the circuit element leads in a predetermined relative position with respect to the standoffs so as to insure contact with the standoffs when the front and rear housings are joined. The method further includes mounting additional circuit elements to the surface of the circuit board, including in the additional layout area created by the standoffs raising the at least one circuit element above the surface of the circuit board. Finally, the electronic system is assembled by mounting the circuit board and any additional system components within the front or rear housing of the system, and removably or fixedly joining together the housings. Thus, the standoffs allow the electronic system to have increased circuitry and/or functionality, as well as a more compact design, by allowing additional circuit elements to be mounted in the additional layout area created by raising the circuit element above the circuit board surface.

Further, additional details of the structure and assembly of the antenna mechanism may be found in co-pending application Ser. No. 10/964,403, entitled "Devices And Methods For Retaining An Antenna," filed concurrently herewith and incorporated by reference above. Similarly, additional details of the structure and assembly of the lens assembly may be found in co-pending application Ser. No. 10/963,962, entitled "Devices And Methods For Retaining A Lens In A Mobile Electronic Device," filed concurrently herewith and incorporated by reference above. And, additional details of the structure and assembly of the mechanisms for connecting together the housings may be found in co-pending application Ser. No. 10/964,405, entitled "Devices And Methods For Connecting Housings," filed concurrently herewith and incorporated by reference above.

The above-described embodiments are provided to enable any person skilled in the art to make or use these described embodiments. Various modifications to these described embodiments will be readily apparent to those skilled in the art, and the generic principles defined herein may be applied to other embodiments without the use of the inventive faculty. Thus, this application is not intended to be limited to the embodiments shown herein, but is to be accorded the widest scope consistent with the principles and novel features disclosed herein.

Other features and advantages of the described embodiments are set forth in the following claims.

What is claimed is:

1. An electronic system, comprising:
at least one standoff having an electrically-conductive contact pad at least partially lying in a first plane and an electrical conductor extending from the contact pad;
at least one circuit element having a body and at least one compression lead connectable between the body and the contact pad, the body having a footprint corresponding to a two-dimensional area associated with a portion of the body, wherein the body comprises a first alignment structure;
a circuit board having a surface with an available layout area corresponding to a predetermined area on the surface usable for mounting circuit elements, wherein the at least one standoff is connectable to the circuit board, wherein the surface substantially lies in a second plane spaced apart from and overlying the first plane, and wherein the available layout area includes at least a portion of a projected area of the footprint; and
a housing having an internal surface operable to receive the circuit element and having a second alignment structure operable in cooperation with the first alignment structure to align the compression lead with the contact pad.

2. The system of claim 1, wherein the contact pad and the electrical conductor are integrally formed.

3. The system of claim 2, wherein the electrical conductor comprises at least one rigid lead.

4. The system of claim 1, wherein the contact pad and the mounting mechanism consist essentially of an electrically-conductive material.

5. The system of claim 1, wherein the at least one circuit element comprises a component selected from the group consisting of an audio speaker, a resistor, a capacitor, an inductor, a switch, an electrical frequency filter, an electrical connector, a circuit board, a chip, an electrical or radio signal shield, a visual display unit, a keyboard unit, a battery unit, a memory device, a processor, an integrated circuit or chip or set of microminiaturized electronic circuits, a transistor, a motor, a rotating unbalanced mechanism, an antenna mechanism, a microphone, a buzzer and an acoustical device.

6. The system of claim 1, wherein the circuit board forms at least a portion of a communications module operable for transmitting and receiving communications signals.

7. The system of claim 1, wherein the system comprises a device selected from the group consisting of a visual output or display device, an audio output device, a mobile phone, a satellite phone, a portable phone, a pager, a wireless two way communications device, a personal digital assistant, a personal computer, a gaming system, a remote control system, a global positioning system ("GPS") receiver or controller, devices communicating via Bluetooth technology, and communications systems involving the receipt and/or transmission of short- or long-range communications signals.

8. An electronic system, comprising:
a circuit board having a surface including a pattern of electrically-conductive traces; and
at least one standoff having an electrically-conductive contact plate and at least one electrically-conductive standoff lead, wherein the standoff lead extends from the contact plate and is connectable with a portion of the pattern of electrically-conductive traces, and wherein at least a portion of the contact plate is positioned at a predetermined height above the surface of the circuit board;

a housing having an internal surface comprising a first alignment feature; and at least one circuit element having at least one lead and a body comprising a second alignment feature, wherein the second alignment feature is operable to cooperate with the first alignment feature to orient each lead with a corresponding contact plate such that each lead is connectable between the corresponding standoff and the circuit element, wherein the at least one circuit element is supportable by the standoff at a sufficient height above the circuit board surface to create an additional layout area between the surface and the body.

9. An electronic system, comprising:

a circuit board having a surface with an available layout area corresponding to a predetermined area usable for mounting circuit elements, the available layout area including a pattern of electrically-conductive traces;

a first standoff having an electrically-conductive first contact plate in electrical communication with at least one electrically-conductive first standoff lead, wherein the at least one first standoff lead extends from the first contact plate and is connectable with a portion of the pattern of electrically-conductive traces;

a second standoff having an electrically-conductive second contact plate in electrical communication with at least one electrically-conductive second standoff lead, wherein the at least one second standoff lead extends from the second contact plate and is connectable with the circuit board, wherein the second contact plate is positioned at a sufficient height to support at least one circuit element away from the surface such that the available layout area includes at least a portion of an area on the surface under the circuit element; and a housing comprising an internal surface having an alignment feature, wherein the internal surface is operable to receive and orient the circuit element such that an electrically-conductive lead on the circuit element is alignable with the first standoff.

10. An electronic system, comprising:

a circuit board having a surface including a pattern of electrically-conductive traces, the surface having an available layout area corresponding to a predetermined area usable for mounting circuit elements;

a plurality of standoffs each having an electrically-conductive contact plate in electrical communication with at least one electrically-conductive standoff lead, wherein each standoff lead associated with at least two of the plurality of standoffs extends from the respective contact plate and is connectable with a portion of the pattern of electrically-conductive traces, wherein each standoff lead supports a respective contact plate at a predetermined height relative to the surface;

at least one circuit element having a body and a pair a compression leads, wherein the pair of compression leads are contactable with a corresponding pair of contact plates of the plurality of standoffs, wherein the body is supportable by at least one of the plurality of standoffs at a sufficient height from the surface such that the available layout area includes at least a portion of an area of the surface facing the body; and a housing comprising an internal surface having an alignment feature, wherein the internal surface is operable to receive and orient the circuit element such that the pair of compression leads are alignable with the corresponding pair of contact plates.

11. The device of claim 10, further comprising a supporting standoff comprising a supporting contact pad connected to a supporting lead, the supporting lead connectable to the circuit board such that the supporting contact pad is spaced apart from the surface of the circuit board, and further comprising a support mechanism comprising a support body positionable between the support standoff and the circuit element, wherein the support standoff and the support mechanism are operable to support the circuit element at the sufficient height.

12. The device of claim 11, wherein the support mechanism comprises an elastic material.

13. The device of claim 11, wherein the support mechanism comprises a non-electrically conductive material.

14. The device of claim 10, wherein the first alignment feature and second alignment feature are operable to cooperate such that the circuit element is movable relative to the first housing in a first plane substantially normal to the internal surface and such that the circuit element is substantially fixed relative to the housing in a second plane substantially perpendicular to the first plane.

15. The device of claim 10, wherein the first alignment feature and second alignment feature are operable to cooperate so as to substantially prevent relative rotation between the circuit element and the first housing.

16. A mobile communications device, comprising:

a circuit board having a surface that includes a pattern of electrically-conductive traces;

a plurality of standoffs each having a contact pad electrically connected to the pattern of electrically-conductive traces, wherein the contact pad is positioned at a constant predetermined height above the surface of the circuit board;

a first housing having an internal surface that includes a circuit element housing with a first alignment feature; and a circuit element having at least one lead and a body with a second alignment feature, the circuit element at least partially positionable within the circuit element housing such that the second alignment feature mates with the first alignment feature to orient the at least one lead with the corresponding one of the plurality of standoffs, each lead connectable between the corresponding standoff and the circuit element, and wherein the circuit element is supportable by the standoffs at a sufficient height above the circuit board surface to create an additional layout area between the surface and the body.

17. The device of claim 16, wherein the pair of leads comprise compression leads extending from the body of the circuit element.

18. The device of claim 17, wherein each of the standoffs further include a pair of standoff leads that connect the contact pad and the pattern of electrically-conductive traces, wherein the pair of standoff leads have a predetermined constant length.

19. The device of claim 18, further comprising at least one of a visual display unit, an antenna mechanism, a battery, a near-field speaker, a microphone, a keyboard, a navigation mechanism and a push-to-talk button.

20. The device of claim 16, further comprising a supporting standoff comprising a supporting contact pad connected to a supporting lead, the supporting lead connectable to the circuit board such that the supporting contact pad is spaced apart from the surface of the circuit board, and further comprising a support mechanism comprising a support body positionable between the support standoff and the circuit element, wherein the support standoff and the support mechanism are operable to support the circuit element at the sufficient height.

21. The device of claim 20, wherein the support mechanism comprises an elastic material.

22. The device of claim 20, wherein the support mechanism comprises a non-electrically conductive material.

23. The device of claim 16, wherein the first alignment feature and second alignment feature are operable to cooperate such that the circuit element is movable relative to the first housing in a first plane substantially normal to the internal surface and such that the circuit element is substantially fixed relative to the housing in a second plane substantially perpendicular to the first plane.

24. The device of claim 16, wherein the first alignment feature and second alignment feature are operable to cooperate so as to substantially prevent relative rotation between the circuit element and the first housing.

25. A method of mounting circuit elements on a circuit board, comprising:
   connecting a first lead from a first standoff to a pattern of electrically-conductive traces on a surface of the circuit board, where the first standoff includes a first contact plate spaced a first predetermined distance from the surface;
   connecting a second lead from a second standoff to the pattern of electrically-conductive traces on the surface of the circuit board, where the second standoff includes a second contact plate spaced a second predetermined distance from the surface;
   receiving a first circuit element at an internal surface of a housing;
   aligning a first alignment feature of the first circuit element with a second alignment feature of the internal surface of the housing, wherein the first circuit element comprises a first circuit element lead and a second circuit element lead;
   positioning the housing relative to the surface of the circuit board such that the first circuit element is spaced apart from the surface of the circuit board and such that the first circuit element lead and the second circuit element lead are respectively connected with the first contact plate and the second contact plate; and
   connecting at least one additional circuit element to the circuit board in at least a portion of an area on the surface of the circuit board adjacent to the first standoff and the second standoff that corresponds to a projected area on the surface of the circuit board of at least a portion of the first circuit element.

26. The method of claim 25, where the first predetermined distance and the second predetermined distance are substantially unequal distances.

27. The method of claim 25, further comprising forming the first standoff and the second standoff in a U-shape.

28. The method of claim 25, further comprising forming the first standoff and the second standoff from an electrically-conductive material.

29. The method of claim 28, where the electrically-conductive material comprises a strip of material.

30. The method of claim 25, further comprising contacting at least one electrical lead extending from the elevated circuit element to a corresponding one of the first contact plate and the second contact plate.

31. The method of claim 25, further comprising connecting a third standoff to the circuit board, and positioning a support mechanism between the third standoff and the circuit element so as to support the circuit element in the spaced apart position relative to the surface of the circuit board, wherein the support mechanism comprises at least one of an elastic material and a non-electrically conductive material.

32. The method of claim 25, further comprising substantially preventing relative rotation between the circuit element and the first housing.

* * * * *